United States Patent [19]

Miller et al.

[11] 4,172,879

[45] Oct. 30, 1979

[54] FERRIC IRON REMOVAL FROM ALUMINUM FLUORIDE SOLUTIONS

[75] Inventors: David J. Miller, Gretna; Tadeusz K. Wiewiorowski, New Orleans, both of La.

[73] Assignee: Freeport Minerals Company, New York, N.Y.

[21] Appl. No.: 895,085

[22] Filed: Apr. 10, 1978

Related U.S. Application Data

[63] Continuation-in-part of Ser. No. 685,327, May 11, 1976, abandoned, which is a continuation-in-part of Ser. No. 496,577, Aug. 12, 1974, Pat. No. 3,961,030.

[51] Int. Cl.² .................. C01G 49/10; C01F 7/22
[52] U.S. Cl. .................. 423/112; 423/132; 423/139; 423/626; 423/484; 423/126
[58] Field of Search ............... 423/112, 126, 132, 139, 423/150, 483, 488, 489, 658.5, 484, 626

[56] References Cited

U.S. PATENT DOCUMENTS

| | | | |
|---|---|---|---|
| 2,155,119 | 4/1939 | Ebner | 423/DIG. 1 |
| 2,920,938 | 1/1960 | Matoush | 423/126 |
| 3,145,081 | 8/1964 | Surls et al. | 423/112 |
| 3,211,521 | 10/1965 | George | 423/139 |
| 3,320,032 | 5/1967 | Feller | 423/139 |
| 3,729,541 | 4/1973 | Grunig et al. | 423/112 |
| 3,961,030 | 6/1976 | Wiewiorowski et al. | 423/132 |
| 3,966,909 | 6/1976 | Grunig | 75/101 BE |

OTHER PUBLICATIONS

Marcus et al., *Ion Exchange and Solvent Extraction of Metal Complexes*, Wiley Interscience (1969), pp. 523–525, 534–536, 538,546,550.

Peppard et al., "Acid Esters of Orthophosphoric Acid as Selective Extractants for Metallic Cations–Tracer Studies", *J. Inorg. and Nucl. Chem.*, vol. 7 (1958), pp. 269, 276–285.

*Primary Examiner*—Brian Hearn
*Attorney, Agent, or Firm*—Fisher, Christen & Sabol

[57] ABSTRACT

A process for the selective separation of ferric iron from an aluminum fluoride aqueous solution containing ferric iron is effected by contacting said solution with an organic extractant phase consisting essentially of a mixture of a mono (higher alkyl-substituted phenyl) phosphoric acid and a di(higher alkyl-substituted phenyl) phosphoric acid dissolved in an inert diluent to thereby transfer the ferric iron to said organic extractant phase. The efficiency of the process is further improved by adjusting the aluminum fluoride aqueous feed solution to a temperature in the range of about 140° F. to about 175° F. prior to contacting it with the organic extractant phase, maintaining the temperature within this range throughout the ferric iron extraction stage or stages, then heating the resulting iron-depleted aqueous raffinate to a temperature higher than 195° F., and then crystallizing aluminum fluoride trihydrate out of the raffinate at this higher temperature.

11 Claims, 2 Drawing Figures

FERRIC IRON REMOVAL FROM ALUMINUM FLUORIDE SOLUTIONS

RELATED APPLICATION

This application is a continuation-in-part of applicants' copending application Ser. No. 685,327, filed May 11, 1976, now abandoned, and which is a continuation-in-part of and copending with applicants' application Ser. No. 496,577, filed Aug. 12, 1974 and entitled "Production of Alumina From Ores", now U.S. Pat. No. 3,961,030.

BACKGROUND OF THE INVENTION

1. Field of the Invention

The present invention relates to the separation of ferric iron and the recovery of aluminum fluoride trihydrate ($AlF_3.3H_2O$) from aqueous aluminum fluoride solutions and particularly from such solutions which contain significant amounts of dissolved ferric iron.

2. Description of the Prior Art

Aluminum fluoride trihydrate ($AlF_3.3H_2O$) is used in the production of aluminum fluoride ($AlF_3$), usually by a heating operation that drives off the water of hydration. The aluminum fluoride, in turn, can be used, for example, in the manufacture of cryolite ($Na_3AlF_6$), in the manufacture of aluminum (Al) by the cryolite process, and in the manufacture of alumina ($Al_2O_3$) as described, for example, in our aforementioned U.S. Pat. No. 3,961,030, the disclosure of which is incorporated herein by reference. A common method of making $AlF_3.3H_2O$ is by the crystallization of aqueous $AlF_3$ solutions. This crystallization is carried out in retention tanks where the aluminum fluoride solutions are agitated for 2–6 hours at temperatures anywhere between 140° and 212° F. under atmospheric pressure in a continuous operation. A batch operation may also be employed, and vacuum crystallization, instead of atmospheric, can be used. The crystallization results in the formation of $AlF_3.3H_2O$ crystals which are separated from the remaining solution, or "mother liquor", by filtration or any other suitable means.

When the aluminum fluoride solution from which $AlF_3.3H_2O$ is crystallized is obtained from a ferric iron-containing clay, or when for whatever reason the solution fed to the crystallizers is contaminated with ferric iron, a substantial portion of the ferric iron reports in the final product of the process. This is undesirable, of course, because commercial specifications are such that the $AlF_3.3H_2O$ stream, after filtration, may not contain more than about 0.1% by weight ferric iron, expressed as $Fe_2O_3$, and quite frequently no more than 0.05% by weight ferric iron. Even though most of the ferric iron in the feed to the crystallizers tends to remain with the mother liquor, these commercial specifications are almost impossible to meet when the feed to the crystallizers contains more than about 1 gpl (grams per liter) $Fe_2O_3$, and especially when it contains more than about 2 gpl $Fe_2O_3$, since substantial amounts of the ferric iron are retained with the aluminum fluoride crystals and remain with them in subsequent steps of the process.

U.S. Pat. No. 3,320,032 (Feller) describes the extraction of iron from solutions containing aluminum sulfate, chloride or nitrate but avoids any mention or suggestion of aqueous aluminum fluoride solutions. Furthermore, the extractants used in the Feller patent exclude the mono(alkylphenyl)phosphoric acids or mixtures of same with di(alkylphenyl)phosphoric acids.

U.S. Pat. No. 3,835,214 (Hurst et al) extracts uranium from "wet-process" phosphoric acid solutions, resulting from the acidulation of phosphate rock and containing phosphoric acid and uranium, iron, calcium, sulfate and fluoride ions, using a mixture of mono- and di(octylphenyl)phosphoric acid (OPPA) as the extractant. The uranium transfers to the extractant but iron apparently does not, thus, providing another example of a prior art teaching which leads the skilled worker away from applicants' invention. We are not here concerned with the extraction of uranium but with the extraction of iron.

U.S. Pat. No. 3,211,521 (George et al) discloses the removal of iron from aqueous aluminum sulfate or nitrate, but makes no mention of the aluminum fluoride solutions. George et al, furthermore, does not disclose, teach or suggest the mixture of mono- and di(octylphenyl)phosphoric acids found to be so unique in the present invention in the extraction of ferric iron from aqueous aluminum fluoride solutions.

The Marcus et al text entitled "Ion Exchange And Solvent Extraction Of Metal Complexes", Wiley-Interscience, Div. of John Wiley And Sons Ltd., New York, 1969, pages 523–525, 534–536, 538, 546 and 550, provides a general discussion of the extraction of metals from certain types of aqueous solutions of aluminum chloride or aluminum sulfate but fails to mention aluminum fluoride aqueous solutions. The extractants disclosed in Marcus et al are alkyl phosphoric acid derivatives and a (2-ethylhexyl)phenylphosphoric acid but no mixture of a mono- and a di(alkylphenyl)phosphoric acid is disclosed. As a matter of fact, the reference (page 525, lines 9–28) teaches the desirability of purifying phosphoric acid mixtures to separate the phosphoric acids because impurities "affect greatly the extractive properties of the reactants". The reference goes on to state that "Much attention, has, thus, been given to the separation of the acids and their purification". The Marcus reference, therefore, tends to lead the skilled worker away from using mixtures and encourages the separation of the acids and purification thereof.

Peppard et al, Journal of Inorganic and Nuclear Chemistry, 1958, Vol. 7, pp. 269, 276–285, presents a general study of the metal extraction power of mixtures of certain esters of orthophosphoric acid, but fails to suggest or disclose the selective extraction of ferric iron from aqueous aluminum fluoride solutions containing it.

U.S. Pat. No. 3,966,909 (Grunig et al I) discloses the process for the recovery of aluminum from aqueous aluminum nitrate, sulfate or chloride solutions. There is no disclosure or suggestion of the extraction of iron from aqueous aluminum fluoride solutions or the use of a combination of mono- and di-(alkylphenyl)phosphoric acids. In addition, the process of Grunig et al I achieves an effect that is quite opposite to that achieved by the present invention, i.e., it removes aluminum in the extractant and leaves most of the ferric iron impurity in the aqueous solution and thus teaches away from the present invention.

U.S. Pat. No. 3,729,541 (Grunig et al II) teaches that commercial alkylphenyl phosphoric acids sometimes come in mixtures of the mono- and di-species but involves the extraction of beryllium, not iron; and the solutions extracted are sulfate solutions, not fluoride solutions.

U.S. Pat. No. 2,920,938 (Matoush) teaches that aqueous AlF$_3$ solutions can be made from an aluminum-bearing material and a fluorine-containing acid followed by crystallization and U.S. Pat. No. 2,155,199 (Ebner) teaches that pyrohydrolysis of aluminum fluoride crystals yields Al$_2$O$_3$ and HF.

No prior art is known which teaches or suggests the use of mixtures of mono-alkylphenyl and di(alkylphenyl) phosphoric acids for removing dissolved ferric iron from aluminum fluoride solutions. Quite to the contrary, the Marcus et al text, the Grunig et al I patent and U.S. Pat. Nos. 3,835,214 (Hurst et al) and 3,514,266 (Nichols et al), teach that aluminum instead of, or in addition to, iron is extracted when various other types of organo-phosphoric acids are used as extractants in aqueous solutions containing aluminum salts other than the fluoride. There is no teaching leading the skilled worker to use the organic extractant mixtures, disclosed and claimed herein, to selectively extract ferric iron from aluminum fluoride solutions containing dissolved iron impurities.

SUMMARY OF THE INVENTION

It is therefore a primary object of the present invention to provide an improved process for the separation of ferric iron from an aqueous solution containing aluminum fluoride and ferric iron.

It is another object of the present invention to provide such a process for eliminating or at least minimizing the ferric iron contamination of aluminum fluoride trihydrate and aluminum fluoride derived therefrom.

It is another object of this invention to provide a process that is highly selective in removing very high amounts of ferric iron compared to the amount of aluminum removed.

It is still another object of the present invention to provide an improved process for the production of alumina from clay-type ores.

Still further objects and advantages of the present invention will become apparent from the drawings and detailed description given hereinafter; it should be understood, however, that the drawing, detailed description and specific examples, while indicating preferred embodiments of the invention, are given by way of illustration only, since various changes and modifications within the spirit and scope of the invention will become apparent to those skilled in the art therefrom.

It has been found that the above objects may be attained by an iron removal circuit wherein an aqueous aluminum fluoride solution having a pH of not more than 3, preferably 2 or less and containing at least about 1 gpl ferric iron, expressed as Fe$_2$O$_3$, is contacted with an organic extractant phase consisting essentially of a mixture of a mono(alkyl-substituted phenyl) ester of phosphoric acid and a di(alkyl-substituted phenyl) ester of phosphoric acid dissolved in an inert diluent. The ferric iron transfers selectively to the organic extractant phase which is then separated from the iron-depleted aqueous raffinate, which retains the aluminum fluoride dissolved therein. The iron-depleted, aluminum fluoride-containing aqueous raffinate from the organic extraction operation can be then fed to a crystallization operation wherein aluminum fluoride trihydrate crystals are produced substantially free of iron impurities. The aluminum fluoride trihydrate produced when the iron removal circuit of this invention is used contains substantially less than 0.1% by weight of ferric iron expressed as Fe$_2$O$_3$ after filtration, and normally less than 0.05% by weight ferric iron expressed as Fe$_2$O$_3$. Preferably, the operating temperature is maintained at about 140° to 175° F. during the iron extraction stages and then raised to 195° F., or higher, prior to crystallization.

The organic extractant phase containing the iron is preferably stripped with an aqueous solution of hydrogen fluoride which causes the iron to transfer selectively to the aqueous phase and at the same time regenerates the organic extractant for recirculation and re-extraction of the aluminum fluoride feed solution.

DESCRIPTION OF THE PREFERRED EMBODIMENT

We have found that a mixture of higher alkyl-substituted mono- and diphenyl phosphoric acids dissolved in an inert diluent is ideally suitable for extracting ferric iron from aqueous aluminum fluoride solutions containing dissolved ferric iron. The mono-, di-(alkylphenyl)-phosphoric acids have the general formulas:

(mono)    (di)

wherein each Ph is a phenylene radical, —(C$_6$H$_4$)—, and each R is a straight chain or branched chain higher alkyl radical containing at least 4 carbon atoms, preferably from 8 to 14 carbon atoms, and may be the same or different, but preferably they are the same. Typical substituents for R include, but are not limited to, the octyl, nonyl and dodecyl radicals. Of these, the octyl radical is preferred because of the ease of commercial availability of the mixture of octyl substituted acids having the above-described formulas and herein designated as OPPA, from, for example, Mobil Chemical Company. An OPPA product sold by Mobil is reported to be a light tan, semi-solid having a minimum acid number (mg KOH/g) of 200, a specific gravity (20°/4° C.) of 1.080 (65° C.), a melting point of 65° C., a flash point (Cleveland Open Cup) of 290° F. and is insoluble in water but soluble in ethanol, acetone, benzenes, toluene and hexane. It has been reported that the octyl groups in OPPA are 1,1,3,3-tetramethylbutyl groups (see U.S. Pat. Nos. 3,835,214 and 3,514,266). Commercially available acid mixtures such as OPPA may often contain small amounts of other alkyl-substituted phenyl phosphoric acids which do not greatly affect the beneficial results obtained from using such mixture in this invention. The mixture of acids contains at least 30% by weight, and preferably from 40% to 60% by weight of each of the mono(alkylphenyl)phosphoric acid and the di(alkylphenyl) phosphoric acid of the formulas given above.

The inert diluent, which is an organic solvent carrier for the extractant liquor, must be one which does not dissolve appreciably in water, nor react with the aqueous aluminum fluoride solution to be treated for ferric iron removal. Among the organic liquids which have been found to be suitable as a carrier solvent for the extractant mixture may be listed the aliphatic hydrocarbons, including kerosene and heptane, and aromatics such as the xylenes. Kerosene has been found to be a particularly suitable diluent for formulating an extractant liquor to be used for removing ferric iron from aqueous aluminum fluoride solutions.

The composition of the organic extractant comprises from about 5 to about 30%, preferably about 10% by weight, of the above-identified mixture of phosphoric acids and the remainder is the inert organic diluent. Optionally, from about 5 to about 30%, preferably about 10% by weight of a higher alkanol, e.g., having 6–18 carbon atoms, such as, decanol, can be added to the organic extractant so that it contains about 5% to about 30% of said mixture of phosphoric acids, about 5% to about 30% of said higher alkanol and the remainder being said organic diluent. While not actually an active part of the extraction agent, the alkanol promotes phase separation after extraction and is conveniently added to the original organic extractant mixture. Preferably, the alkanol is added to the system prior to the first mixing operation of the extraction step and always prior to the phase separation. A preferred organic extractant contains about 10% of the mixture of acids, about 10% of decanol and about 80% kerosene, all by weight. Other alkanols which may be used include nonanol, undecanol, dodecanol, tridecanol, and any other alkanol of low water solubility. In addition the extractant can contain any other material that does not by its nature or amount adversely affect the extraction of ferric iron from said aqueous $AlF_3$ solutions.

The feed to the process is an aqueous aluminum fluoride solution, hereafter called "$AlF_3$ liquor", containing 5–40%, and preferably 10–30%, $AlF_3$ by weight, and at least about 1 gpl, and more often 2–4 gpl, ferric iron, expressed as $Fe_2O_3$. This liquor is extracted with the extractant using an organic-to-aqueous volumetric ratio (O/A) of between about 1/1 and about 1/10, and preferably about ⅓.

Figure 1:
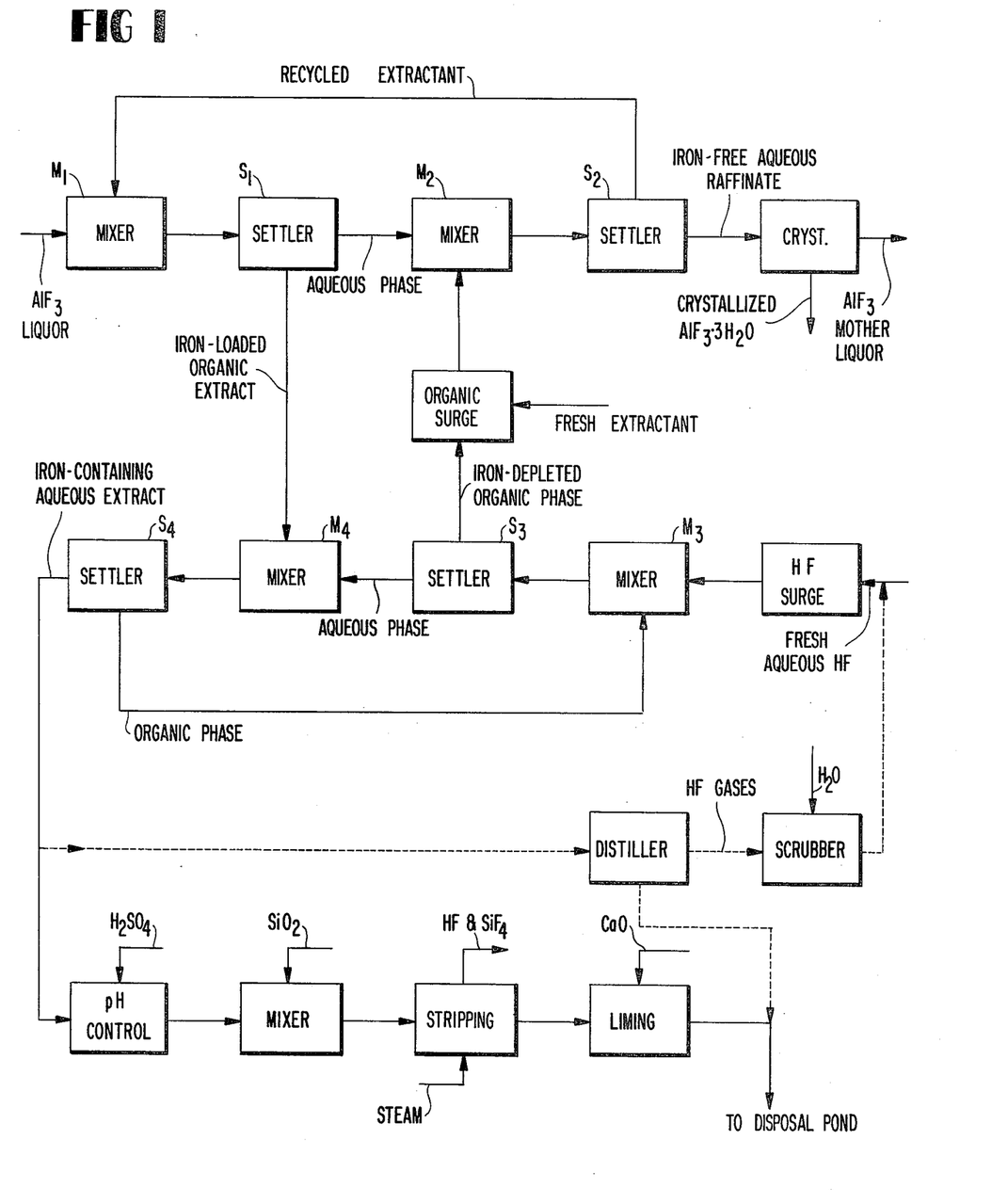
FIG. 1 is a schematic flowsheet of a preferred embodiment of the present invention.

A preferred embodiment of the invention is illustrated in FIG. 1. A total of 4 mixer-settler combinations ar used, 2 for extraction and 2 for stripping. More or less could be used depending on the composition of the streams and the efficiency sought. The preferred organic-to-aqueous volumetric ratio of around ⅓ refers, in FIG. 1, to the ratio of the volume of the organic stream flowing into mixer $M_2$ to the volume of the aqueous stream flowing into mixer $M_1$. The extractant stream which contacts the aqueous $AlF_3$ stream in mixer $M_1$ is a recycle stream obtained from settler $S_2$, as more fully explained hereinafter.

From mixer $M_1$ the organic and aqueous mixture flows to settler $S_1$ where it separates into an iron-depleted aqueous phase and an iron-loaded organic extract. The iron-depleted aqueous phase still contains some iron, and is contacted in mixer $M_2$ with additional extractant from the orgaic surge tank, as shown in FIG. 1. From mixer $M_2$ the new mixture is moved to settler $S_2$ where it separates into an "iron-free" aqueous raffinate, which is fed to the crystallizer, and a recycle organic extractant stream, which is used to contact the $AlF_3$ liquor in mixer $M_1$, as explained above. Crystallization of the iron-free raffinate results in the formation of an $AlF_3 \cdot 3H_2O$ that contains less than 0.05% by weight iron after filtration.

The iron-loaded organic extract from settler $S_1$ then flows to the stripping stages of the system where it is contacted with an aqueous HF solution. The HF concentration of this solution should be between 5% and 40%, and preferably between 20% and 30% by weight. The organic-to-aqueous volumetric ratio for the stripping operation should be between 2/1 and 20/1, and preferably between 5/1 and 10/1. This preferred ratio refers, in FIG. 1, to the ratio of the volume of the organic stream flowing into mixer $M_4$ to the volume of the aqueous stream flowing into mixer $M_3$, as explained more fully hereinbelow. The aqueous HF-containing solution that contacts the iron-loaded organic extract in mixer $M_4$ of FIG. 1 is the aqueous phase leaving settler $S_3$. The iron-loaded organic extract flowing into mixer $M_4$ illustratively has an iron content of about 2–10 gpl, expressed as $Fe_2O_3$. The mixture of organic and aqueous phases leaving mixer $M_4$ is fed to settler $S_4$ where it separates into an iron-containing aqueous extract and an organic phase that is recycled to mixer $M_3$. The iron-containing aqueous extract is the stream through which the iron contaminants are removed from the system. Illustratively, the iron content of this stream is between 5 and 60 gpl, expressed as $Fe_2O_3$. The organic phase from settler $S_4$ contacts the aqueous HF solution in mixer $M_3$ and the resulting mixture is separated in settler $S_3$ into the regenerated extractant stream, which is the iron-depleted organic phase, and an aqueous phase which is used to strip the iron from the iron-loaded organic extract in mixer $M_4$. The iron-depleted organic phase from settler $S_3$ combines with fresh extractant in the organic surge and proceeds to mixer $M_2$ to extract the aluminum fluoride liquor as explained above. Fresh aqueous HF is fed to the HF surge that provides the aqueous HF for regenerating the organic extractant.

We have found that, when operating the iron removal circuit, the efficiency of the process is improved by controlling the temperatures at which the various stages are operated. While the extraction step is operable at any temperature between about room temperature and the decomposition temperature of the organic extractant, preferably the temperature of the $AlF_3$ liquor and organic extractant are maintained between 140° and 175° and the extraction step conducted within this temperature range. Similarly, while the crystallization step is operable at temperatures of from 140° to 212° F., preferably the temperature of the iron-depleted aqueous raffinate is increased to 195° F., or higher, prior to crystallization and the crystallization conducted at the increased temperature.

The process of the present invention is suitably carried out at ambient pressure although moderately elevated or reduced pressures may be used. The extraction step is carried out for a time sufficient to transfer the iron from the aluminum fluoride aqueous solution to the organic extractant, and generally this will be accomplished using mixing retention times between 0.2 and 30 minutes, and preferably between 0.5 and 10 minutes, in each mixer.

The crystallization is carried out in accordance with procedures and apparatus well known to those skilled in the art. Preferably, it is conducted within the above-described temperatures and with retention times of about 2 to 6 hours. A further discussion of the crystallization procedure will be found in our aforementioned U.S. Pat. No. 3,961,030. Thus, for example, when the process is used in conjunction with the manufacture of alumina from kaolin and hydrofluoric acid as described in our U.S. Pat. No. 3,961,030, the filtrate AlF₃ liquor which flows into the crystallizers is normally at a temperature above 195° F. In applying the process of this invention to the process of that patent the temperature of the AlF₃ liquor is first reduced to 140°–175° F., and then the iron is extracted as described above, after which the temperature of the iron-depleted aqueous raffinate is increased to 195° F., or higher, and the raffinate is subsequently subjected to crystallization. We have found that this permits the iron extraction to be carried out with virtually no premature crystallization, and consequent precipitation, of aluminum fluoride, and this results in an optimum recovery of AlF₃.3H₂O. Cooling and heating of the AlF₃ liquor before and after iron extraction may be done in water-cooled and steam-heated heat exchangers, respectively, or in any other suitable type of equipment.

It is possible to provide a substantial portion of the aqueous HF required to regenerate the organic extractant by distilling the iron-containing aqueous extract from settler S₄ and scrubbing evolved resulting HF gases with water or any other suitable solution. The aqueous HF solution thus made may be combined with fresh aqueous HF and used to strip the organic extract as described above. In any case, the iron-containing aqueous extract leaving settler S₄ in FIG. 1 would normally be treated to recover some of its fluorine values and/or convert them to a form suitable for disposal. FIG. 1 shows one sequence of operations that are suggested for this purpose. The H₂SO₄ pH control step simply makes the fluorine content of the extract amenable to the reaction:

$$SiO_2 + 4HF \rightarrow SiF_4(v) + 3H_2O(v)$$

which takes place upon silica addition and heating. The SiF₄ vapors, together with some HF vapors, may be scrubbed or may be sent to disposal. The liming operation precipitates residual fluorine as CaF₂, iron as Fe(OH)₃, and sulfate as CaSO₄, which are then sent to a disposal pond. The pH control, silica addition, stripping or distilling, and liming operations are all optional steps of the process.

The following examples are provided to further illustrate the invention. In these examples, all parts are parts by weight unless otherwise indicated.

EXAMPLE 1

Test 1

A solution of AlF₃ containing Fe⁺² was prepared by adding 1.69 grams of FeSO₄.7H₂O to a solution of 76.4 grams of HF in 127.2 grams of H₂O and heating to 55° C., while mixing, under a nitrogen purge (to prevent oxidation), then adding 46.43 grams of Al(OH)₃ to the solution, and cooling the resulting exothermic mixture to about 60° C. The pH of the resulting solution was 1.72. The solution was put in a controlled temperature bath at about 66° C. the AlF₃ content of this solution was about 20% by weight, or about 6.43% by weight Al and was formed by the reaction:

$$3HF + Al(OH)_3 \rightarrow AlF_3 + 3H_2O.$$

The Fe⁺² content of this solution was 1.8 g/l, as reported by titration analysis.

The resulting aqueous AlF₃ solution was extracted with an OPPA-organic solvent extractant. This extractant was prepared by dissolving 100 grams of commercially available (from Mobil Chemical) OPPA in a previously-prepared solution of Napoleum 470 and decanol containing 10% by volume decanol and 90% by volume Napoleum 470. 1000 mls of the extractant was prepared. The weight % of OPPA in the resulting extractant was about 12; the volume % decanol was about 9–10.

Extraction was then carried out by mixing 175 mls of the above-mentioned aqueous AlF₃ solution with 175 mls of the above-mentioned organic extractant, that is, using a volumetric ratio of 1:1. The two phases were contacted in an agitated beaker at around 66° C., then allowed to separate from each other in a separatory funnel. The nitrogen purge was maintained throughout these operations. After separation, the aqueous phase was analyzed for Fe⁺², and the organic phase was analyzed for Al. The Fe⁺² content of the aqueous phase after extraction was 1.7 g/l. The Al content of the organic phase after extraction was 0.014% by weight, as reported by atomic absorption analysis.

In addition, the density of the aqueous phase prior to extraction and the density of the organic phase after extraction were also measured by weighing known volumes of liquids. It was determined that the density of the aqueous phase prior to extraction was 1.219 g/ml; that of the organic phase after extraction was 0.8357 g/ml.

The % extraction of Fe⁺² and of Al, therefore, was:

$$\% \text{ Extraction of Fe}^{+2} = \frac{1.8 - 1.7}{1.8} \times 100 = 5.56$$

$$\% \text{ Extraction of Al} = \frac{\frac{1.75 \times 0.8357 \times 0.014}{100}}{\frac{175 \times 1.219 \times 6.43}{100}} \times 100 = 0.14$$

Test 2

The test was substantially the same as Test 1 but, instead of ferrous sulfate, ferric sulfate was added to the aqueous solution. In addition, there was no nitrogen purge. The pH of the aqueous solution prior to extraction was 1.60. Extraction was carried out as in Test 1, that is, using the same extractant and a volumetric ratio of 1:1. The volume of aqueous AlF₃ solution extracted was 175 mls; the volume of organic after extraction was 174 mls. The Fe⁺³ content of the aqueous solution prior to extraction was 9.2 gpl. After extraction, the Fe⁺³ content of the aqueous phase was 5.3 gpl. The density of the aqueous solution prior to extraction was 1.232 g/ml. The density of the organic phase extraction remained 0.8357 g/ml. The Al content of the organic after extraction was 0.002 weight %.

Extraction of Fe⁺³ and of Al, therefore, was as follows:

$$\% \text{ Extraction of Fe}^{+3} = \frac{9.2 - 5.3}{9.2} \times 100 = 42.4$$

$$\% \text{ Extraction of Al} = \frac{\frac{174 \times 0.8357 \times 0.002}{100}}{\frac{175 \times 1.232 \times 6.43}{100}} \times 100 = 0.02$$

Test 3

This test was a duplication of Tests 1 and 2, except that both Fe⁺² and Fe⁺³ were added to the aqueous solution of aluminum fluoride. Fe⁺³ was added as Fe₂(-

$SO_4)_3$; $Fe^{+2}$ was added as $FeSO_4$. The pH of the aqueous phase prior to extraction was 1.49. The $Fe^{+2}$ content of the aqueous prior to extraction was 0.8 gpl; after extraction it was still 0.8 gpl. The $Fe^{+3}$ content of the aqueous prior to extraction was 4.8 gpl; after extraction it was 2.2 gpl. The volume of aqueous solution extracted was 176 mls; the volume of organic extractant after extraction was 174 mls. The density of the aqueous solution prior to extraction was 1.226 g/ml; that of the organic extractant after extraction was 0.8357 g/ml. The Al content of the organic extractant after extraction was 0.001% by weight.

Extraction of $Fe^{+2}$, $Fe^{+3}$ and Al, therefore, was as follows:

$$\% \text{ Extraction of } Fe^{+3} = \frac{4.8 - 2.2}{4.8} \times 100 = 54.2$$

$$\% \text{ Extraction of } Fe^{+2} = \frac{0.8 - 0.8}{0.8} \times 100 = 0$$

$$\% \text{ Extraction of Al} = \frac{\frac{174 \times 0.8357 \times 0.001}{100}}{\frac{176 \times 1.226 \times 6.43}{100}} \times 100 = 0.01$$

Test 4

An aluminum chloride solution was prepared by mixing 33.34 grams of $AlCl_3$ and 5.54 grams of HCl in 216.66 grams of water, so as to provide an $AlCl_3$ content of 13% by weight, or 2.62% by weight Al. The pH of this solution was 0.54. To this solution was added 1.98 grams of $Fe_2(SO_4)_3$. The $Fe^{+3}$ content was 1.9 gpl prior to extraction.

The solution was then extracted with the same OPPA extractant prepared for Tests 1 through 3, using the same volume ratio and same procedure. The volume of aqueous solution extracted was 200 mls; the volume of the organic extractant after extraction was 192 mls. The density of the aqueous solution prior to extraction was 1.127 g/ml; that of the organic extractant was 0.8357 g/ml. The aluminum content of the organic extractant after extraction was 0.109% by weight Al. The $Fe^{+3}$ content of the aqueous solution after extraction was 0.9 gpl. Extraction of $Fe^{+3}$ and of Al, therefore, was as follows:

$$\% \text{ Extraction } Fe^{+3} = \frac{1.9 - 0.9}{1.9} \times 100 = 52.6$$

$$\% \text{ Extraction of Al} = \frac{\frac{192 \times 0.8357 \times 0.109}{100}}{\frac{200 \times 1.127 \times 2.62}{100}} \times 100 = 2.96$$

Test 5

An aluminum nitrate solution was prepared by mixing 352.24 grams of $Al(NO_3)_3 \cdot 9H_2O$ with 158.80 grams of $H_2O$ and 3.13 grams of $HNO_3$, so as to provide an aqueous aluminum nitrate solution having 36.8% by weight $Al(NO_3)_3$, or 4.67% by weight Al. To this solution was added 1.98 grams of $Fe_2(SO_4)_3$, so that the $Fe^{+3}$ content was 2.0 gpl prior to extraction. The pH was 0.11. Extraction was carried out as in Tests 1-4, with 80 mls of aqueous solution being extracted. The volume of organic extractant after extraction was 75 mls. Density of the aqueous solution prior to extraction was 1.165 g/ml; that of the organic extractant after extraction was 0.8357 g/ml. The $Fe^{+3}$ content of the aqueous solution after extraction was 0.5 gpl. The Al content of the organic extractant after extraction was 0.095% by weight. Extraction of $Fe^{+3}$ and of Al, therefore was as follows:

$$\% \text{ Extraction of } Fe^{+3} = \frac{2.0 - 0.5}{2.0} \times 100 = 75.0$$

$$\% \text{ Extraction of Al} = \frac{\frac{75 \times 0.8357 \times 0.095}{100}}{\frac{80 \times 1.165 \times 4.67}{100}} \times 100 = 1.37$$

The results of Tests 1-5 are tabulated in Table 1 below for ease of comparison:

TABLE 1

| Test | Type of Solution | pH | % Al in Solution | % $Fe^{+2}$ Extracted | % $Fe^{+3}$ Extracted | % Al Extracted | Selectivity* |
|---|---|---|---|---|---|---|---|
| 1 | fluoride | 1.72 | 6.43 | 5.56 | — | 0.14 | — |
| 2 | fluoride | 1.60 | 6.43 | — | 42.4 | 0.02 | 2120.0 |
| 3 | fluoride | 1.49 | 6.43 | 0 | 54.2 | 0.01 | 5420.0 |
| 4 | chloride | 0.54 | 2.62 | — | 52.6 | 2.96 | 17.8 |
| 5 | nitrate | 0.11 | 4.67 | — | 75.0 | 1.37 | 54.7 |

*Selectivity = $\frac{\% \, Fe^{+3} \text{ extracted}}{\% \text{ Al extracted}}$ These results clearly show the advantages of the present invention in removing ferric iron from aluminum fluoride solutions as compared to aluminum chloride or nitrate solutions. It is striking to note that the selectivity of the process of this invention (Tests 2 and 3) for extracting $Fe^{+3}$ instead of aluminum is more than 100 times greater than that with the chloride solutions and more than 30 times greater than that with the nitrate solution.

EXAMPLE 2

An aluminum fluoride liquor having a pH of not more than 2 and containing 20% by weight $AlF_3$ and 2.7 gpl ferric iron expressed as $Fe_2O_3$ was contacted with an organic extractant made up of 100 gpl OPPA as defined hereinabove (about 10% by weight) and 10% decanol in Napoleum 470, an aliphatic hydrocarbon diluent manufactured by Kerr-McGee Corporation, at a temperature of 150° F. An organic-to-aqueous ratio (O/A) of 1/1 was used to extract the $AlF_3$ liquor in a separatory funnel shaking test. The resulting iron-loaded organic extract contained 2.6 gpl ferric iron expressed as $Fe_2O_3$, and the iron-free aqueous raffinate contained only 0.08 gpl ferric iron expressed as $Fe_2O_3$, indicating a ferric iron removal efficiency of 97% and a distribution coefficient (ferric iron in organic-to-ferric iron in aqueous) of about 32. Crystallization of the iron-depleted aqueous raffinate at a temperature of 210° F. resulted in an $AlF_3 \cdot 3H_2O$ that contained less than 0.05% by weight ferric iron expressed as $Fe_2O_3$. Three other tests were then made where the O/A was changed to ½, 1/5 and 1/10, respectively. Results are tabulated in Table 2 below.

TABLE 2

Extraction of AlF$_3$ liquor containing 2.7 gpl ferric
iron expressed as Fe$_2$O$_3$ with OPPA-decanol-kerosene extractant

| O/A | Ferric Iron in Resulting Organic, gpl Fe$_2$O$_3$ | Ferric Iron in Resulting Aqueous, gpl Fe$_2$O$_3$ | Total Ferric Iron in Aqueous, g Fe$_2$O$_3$ | Total Ferric Iron in Organic and Aqueous, g Fe$_2$O$_3$ | % Ferric Iron Removal | Extraction Coefficient |
|---|---|---|---|---|---|---|
| 1/1 | 2.6 | 0.08 | 0.08 | 2.7 | 97 | 32.5 |
| 1/3 | 7.5 | 0.21 | 0.63 | 8.1 | 92 | 36 |
| 1/5 | 10.1 | 0.68 | 3.4 | 13.5 | 75 | 15 |
| 1/10 | 10.2 | 1.68 | 16.8 | 27.0 | 38 | 6 |

EXAMPLE 3

The stripping efficiency of the system of Example 2 was tested with a ferric iron-loaded organic extract containing 5 gpl ferric iron as Fe$_2$O$_3$. The aqueous HF used had an HF concentration of 20% by weight. An organic-to-aqueous ratio (O/A) of 2/1 was first used. The resulting ferric iron-containing aqueous extract contained 8.30 gpl ferric iron as Fe$_2$O$_3$, and the resulting iron-depleted organic raffinate contained 0.85 gpl ferric iron as Fe$_2$O$_3$, indicating a ferric iron removal efficiency of 83% and a stripping coefficient (ferric iron in aqueous-to-ferric iron in organic) of almost 10. Two other runs were then conducted wherein the O/A was changed to 5/1 and 10/1, respectively. Results are shown in Table 3. Similar tests were then carried out with a 30% HF solution as the stripping agent and O/A ratios of 5/1, 10/1 and 20/1 were tested. The results of these tests are also shown in Table 3.

TABLE 3

Stripping of ferric iron-loaded organic extract
containing 5 gpl ferric iron as Fe$_2$O$_3$ with 20% and 30% aqueous HF

| % HF | O/A | Ferric Iron in Resulting Aqueous, gpl Fe$_2$O$_3$ | Ferric Iron in Resulting Organic gpl Fe$_2$O$_3$ | Total Ferric Iron in Organic, g Fe$_2$O$_3$ | Total Ferric Iron in Organic and Aqueous, g Fe$_2$O$_3$ | % Ferric Iron Removal | Stripping Coefficient |
|---|---|---|---|---|---|---|---|
| 20 | 2/1 | 8.30 | 0.85 | 1.7 | 10 | 83 | 10 |
| 20 | 5/1 | 18.2 | 1.36 | 6.8 | 25 | 73 | 13 |
| 20 | 10/1 | 27.5 | 2.25 | 22.5 | 50 | 55 | 12 |
| 30 | 5/1 | 21.4 | 0.72 | 3.6 | 25 | 86 | 30 |
| 30 | 10/1 | 39.2 | 1.08 | 10.8 | 50 | 78 | 36 |
| 30 | 10/1 | 51.2 | 2.44 | 48.8 | 100 | 51 | 21 |

The following example illustrates the invention when carried out in the apparatus shown in FIG. 1.

EXAMPLE 4

About 5260 pounds per minute of a domestic uncalcined kaolin clay, containing about 18% by weight aluminum, expressed as Al, and about 0.8% by weight iron, expressed as Fe$_2$O$_3$, are treated in accordance with the method of U.S. Pat. No. 3,961,030 by mixing with about 12,000 pounds per minute of a by-product fluosilicic acid obtained from the manufacture of wet process phosphoric acid and having an H$_2$SiF$_6$ content of 21% by weight. The resulting slurry undergoes agitation at 193° F. and atmospheric pressure in a digestion tank. Retention time in the tank is about 20 minutes. From the tank the slurry is sent to a filtration step to be separated into about 13,260 pounds per minute of an aluminum fluoride filtrate and 4,000 pounds of silica solids. The filtrate contains 6.43% by weight Al (20% by weight AlF$_3$) and 2.70 grams per liter (gpl) of ferric iron, expressed as Fe$_2$O$_3$. This is equivalent to 0.22% by weight Fe$_2$O$_3$. The pH of the filtrate is 1.7. Aluminum extraction from the clay is in the order of 90%. The silica solids contain 2.36% by weight Al and 13.4% by weight iron, expressed as Fe$_2$O$_3$.

The filtrate liquor is first cooled to about 145° F. by means of a water-cooled heat exchanger, and then fed to a mixer M$_1$, shown in FIG. 1, at a rate of about 1304 gallons per minute (GPM). In mixer M$_1$ the liquor is contacted with about 435 GPM of recycle organic extractant from settler S$_2$. This recycle stream already contains about 2.0 gpl ferric iron expressed as Fe$_2$O$_3$ and about 0.001% by wt. Al from having contacted iron-containing AlF$_3$ liquor in mixer M$_2$ and settler S$_2$. Contact retention time in mixer M$_1$ is 2 minutes. From mixer M$_1$ the organic and aqueous mixture flows to settler S$_1$ where it separates into an iron-depleted aqueous phase, now containing about 0.6 gpl ferric iron expressed as Fe$_2$O$_3$, and an iron-loaded organic extract, carrying most of the iron impurities and having a ferric iron content of 8.32 gpl expressed as Fe$_2$O$_3$. This iron-loaded organic extract is fed to mixer M$_4$ to be stripped of its iron content as further described hereinbelow. The aqueous phase leaving settler S$_1$ is contacted with 435 GPM of organic extractant from the organic surge in mixer M$_2$. The organic extractant has a composition of 10% by weight OPPA in Napoleum 470. In order to improve phase separation during extraction a small amount of decanol (about 10% by total weight of extractant) is added to the fresh extractant feed to the organic surge. Retention time in mixer M$_2$ is 2 minutes. From mixer M$_2$ the new mixture of aqueous and organic flows at about 1739 GPM to settler S$_2$ where it separates into an iron-free aqueous raffinate, containing about 0.07 gpl ferric iron expressed as Fe$_2$O$_3$ and about 6.43% Al by weight, and an organic phase which is then recycled to mixer M$_1$ to extract incoming AlF$_3$ liquor as already mentioned. The temperature in each mixer and settler is maintained within 5 degrees of 145° F. throughout the extraction stages. From settler S$_2$ the iron-free aqueous raffinate has a pH of about 1.7 and flows at a rate of 1304 GPM to a heat exchanger (not shown), where its temperature is raised to 212° F., and then to three crystallizers in series. Each crystallizer is provided with a motor driven (50 HP) agitator, and is steam-jacketed so as to maintain the 212° F. temperature throughout the crystallization operation. Total crystallization retention time is 4 hours. After filtration in three water-washed pan filters, the crystallized $AlF_3.3H_2O$ flows at a rate of about 4400 pounds per minute and contains only 0.015% by weight ferric iron expressed as $Fe_2O_3$. The crystallization mother liquor, flowing at about 8852 pounds per minute, still contains about 2.5% by weight $AlF_3$, i.e., 0.8 wt. % Al, and may then be recycled to other stages of the process for further treatment.

The iron-loaded organic extract leaving settler $S_1$ and containing 8.32 gpl ferric iron expressed as $Fe_2O_3$ and 0.012 wt. % Al flows at about 435 GPM into the stripping stages via mixer $M_4$ where it contacts about 70 GPM of the aqueous HF phase from settler $S_3$. From mixer $M_4$ the aqueous and organic mixture is fed to settler $S_4$ to be separated into an iron-containing aqueous extract, through which the ferric iron impurities are bled from the process, and an organic phase, having an aluminum content of 0.001 wt.% and ferric iron content of 1.54 gpl expressed as $Fe_2O_3$ which is recycled back to mixer $M_3$. The ferric iron-containing aqueous extract from settler $S_4$ flows at about 70 GPM and has a ferric iron content of 49.3 gpl expressed as $Fe_2O_3$ and an Al content of about 0.07 wt. %. This stream is further processed through a $H_2SO_4$ treatment and a silica addition step prior to being stripped and limed for disposal. In mixer $M_3$ the recycled organic phase from settler $S_4$ is contacted with 70 GPM of a 30% aqueous HF from the HF surge. From mixer $M_3$ the aqueous and organic mixture is fed to settler $S_3$ to be separated into an aqueous phase, containing 7.08 gpl ferric iron expressed as $Fe_2O_3$, which is sent to contact the incoming ferric iron-loaded organic extract in mixer $M_4$, and an iron-depleted organic phase, representing the regenerated extractant, which is then sent to the organic surge to be mixed with fresh make-up OPPA. The iron-depleted organic phase has a ferric iron content of 0.4 gpl $Fe_2O_3$ and an Al content of about 0.001 wt. % and flows into the organic surge at approximately 435 GPM. Organic losses in the circuit are minimal. Mixing retention time in mixers $M_3$ and $M_4$ is 2 minutes each. The temperature throughout the stripping stages is also maintained to within 5 degrees of 145° F.

As can be seen, the percent iron removed in the extraction stages is in the order of 97.4%, and that removed in the stripping stages is in the order of 95.2%. Aluminum extraction, on the other hand, is in the order of only 0.0586%.

The crystallized aluminum fluoride trihydrate stream from the crystallization operation, containing about 18% by weight Al and about 0.015% by weight $Fe^{+3}$ as $Fe_2O_3$, is then dried at about 220° F. and dehydrated at about 800° F. to yield $AlF_3$, which is then heated to 1800° F. in the presence of sufficient steam to convert practically all of it to $Al_2O_3$, in accordance with the method in U.S. Pat. No. 3,961,030. The HF liberated during the pyrohydrolysis is absorbed in the crystallization mother liquor and can be recycled to the initial stages of the process to digest incoming clay. After cooling to about 150° F. the alumina product has an $Al_2O_3$ content of 99.6% by weight and an $Fe^{+3}$ content of less than 0.02% by weight expressed as $Fe_2O_3$. Other impurities, such as $SiO_2$, $TiO_2$ and F, are nil.

The overall product yields, based upon the aluminum content of the clay, is about 84%. Some of these results are tabulated in Table 4, below:

TABLE 4

| OPERATION OF THE PROCESS OF FIGURE 1 | |
|---|---|
| O/A in Extraction stage | ½ |
| Ferric Iron in $AlF_3$ liquor (gpl $Fe_2O_3$) | 2.70 |
| Ferric Iron in iron-loaded organic extract (gpl $Fe_2O_3$) | 8.32 |
| Ferric Iron in iron-free aqueous raffinate (gpl $Fe_2O_3$) | 0.07 |
| Percent ferric iron removal in Extraction stages | 97.4% |
| Extraction Coefficient in First Stage (M1 & S1) | 13.9 |
| Extraction Coefficient in Second Stage (M2 & S2) | 28.6 |
| O/A in Stripping stages | 6.2/1 |
| Ferric Iron in iron-containing aqueous extract (gpl $Fe_2O_3$) | 49.3 |
| Ferric iron in iron-depleted organic phase (gpl $Fe_2O_3$) | 0.4 |
| Percent ferric iron removal in Stripping stages | 95.2% |
| Stripping Coefficient in First Stage (M4 & S4) | 32.0 |
| Stripping Coefficient in Second Stage (M3 & S3) | 17.7 |

The apparatus shown in FIG. 1 may also be operated in the same manner as in Example 4 but without making any temperature adjustments. If this is done, the incoming $AlF_3$ liquor fed to mixer $M_1$ is not subjected to cooling prior to iron extraction but rather remains at, for example, 200° F. throughout the extraction stages. The iron-free aqueous raffinate from settler $S_2$ is then subjected to crystallization as in Example 4, but without any temperature adjustment, i.e., crystallization is carried out at 200° F. While it is possible to operate the apparatus of FIG. 1 in this fashion, when no temperature adjustment is made aluminum fluoride trihydrate solids tend to form and accumulate in the mixer and settlers, lowering the overall efficiency of the operation. In addition, these solids tend to absorb organic matter and form a crud-like material which interferes with phase separation during extraction. This does not occur when the temperature adjustment feature is used. We have found that optimum results and increased efficiencies are obtained when the temperature adjustment feature is used to operate the process.

As described hereinabove, the present invention is especially suited for use in processes for the production of alumina from ores such as disclosed in our U.S. Pat. No. 3,961,030. The invention of that application is accomplished by reacting an aluminum-containing ore, such as the various aluminum-enriched clays, with an inorganic fluorine acid such as hydrofluoric acid (HF), fluosilicic acid ($H_2SiF_6$), or mixtures thereof. During the reaction, the aluminum content of the ore is solubilized to produce an aqueous solution of aluminum fluoride ($AlF_3$) and a residue of solids. The $AlF_3$ dissolved in the liquid phase of the reaction mixture is then recovered by subjecting the separated liquid phase to crystallization to produce $AlF_3.3H_2O$ crystals which are then dried and dehydrated to yield $AlF_3$. The crystallization mother liquor is recycled to the process to recover its $AlF_3$ values. The $AlF_3.3H_2O$ crystals and the separated solids residue from the reaction mixture are washed to recover their $AlF_3$ values and the wash water then recycled to the process. The recovered $AlF_3$ is then pyrolyzed in the presence of water vapor to produce $Al_2O_3$ and HF. The HF produced in the pyrohydrolysis step is recycled to the ore treating step by absorbing it in one of the recycled aqueous streams of the process such as the mother liquor from the crystallization step. The unique recycling of $AlF_3$-enriched liquid streams and the recovery and recycle of $AlF_3$ values contained in various solids streams produced in the process permits recoveries of 90% or more of the aluminum content of the ore in the form of high purity alumina. This, coupled with the mild leaching conditions used, the recycling of the fluorine acid, and the fact that uncalcined ores can be employed, results in a process for producing alumina from domestic aluminum reserves which offers potential economic advantages over processes heretofore described.

A convenient source of the fluorine-containing acid used in that process is the by-products of a wet process phosphoric acid facility. As is known, these facilities generate large amounts of gases such as HF and silicon tetrafluoride ($SiF_4$) in the digestors and concentrators of the process, as well as liquid streams of HF and $H_2SiF_6$ which result from absorbing the HF and $SiF_4$ gases in water. The HF and $SiF_4$, like the HF from the pyrohydrolysis step, can also be absorbed in an aqueous recycle stream to form $H_2SiF_6$ which is then returned to the ore treating step. Of course, any source of the required HF and $H_2SiF_6$ can be used in the practice of that invention. However, a wet process phosphoric acid facility is normally a plentiful and inexpensive source of these materials, a factor which makes the process of that invention particularly adaptable for integration with a wet process phosphoric acid facility.

Figure 2:
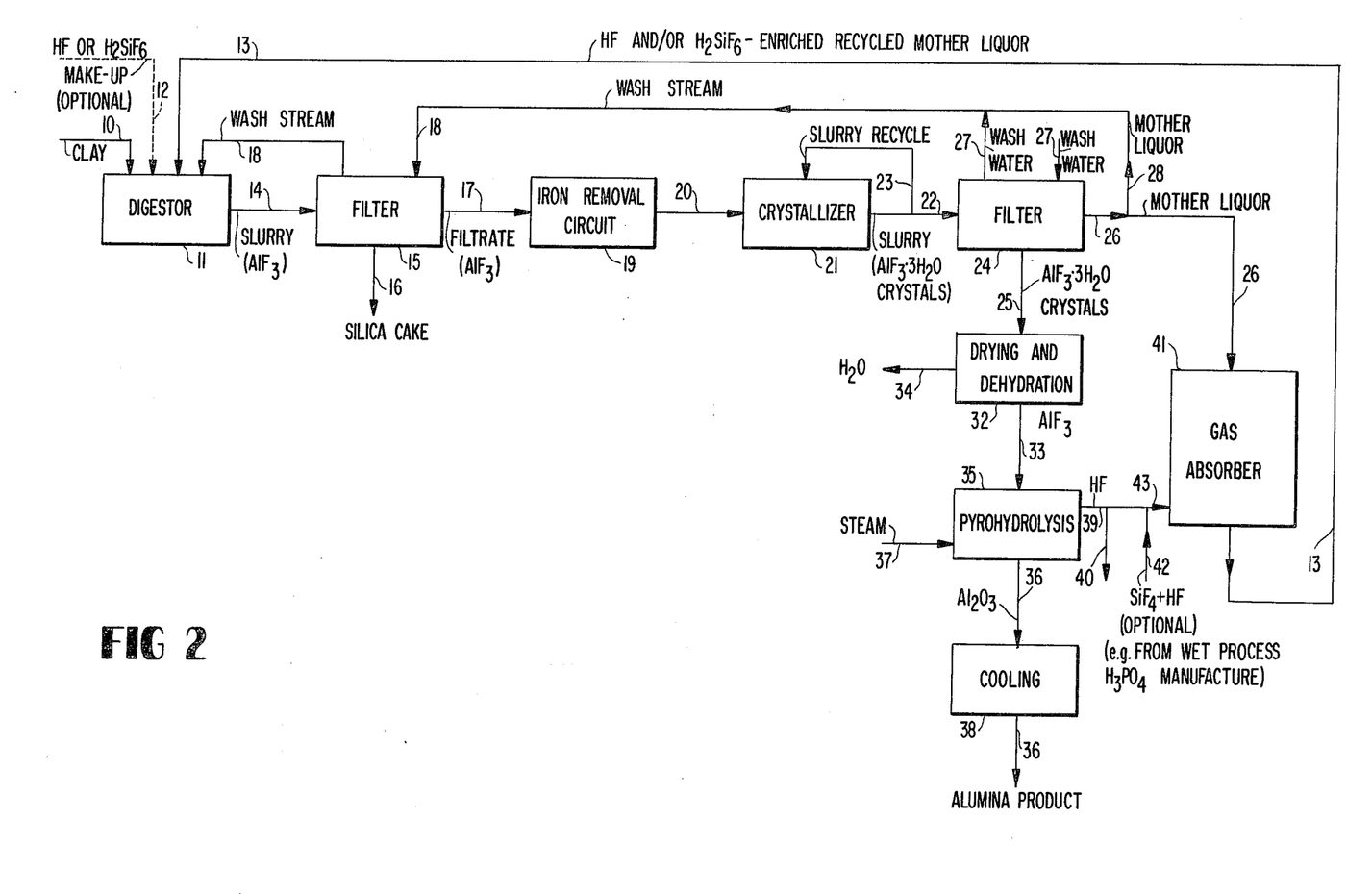
FIG. 2 is a schematic flowsheet of a preferred embodiment of the process of U.S. Pat. No. 3,961,030, also incorporating the process of the present invention.

In FIG. 2 herein, which is a schematic flowsheet of preferred embodiments of the invention of said copending application, incorporating the process of this invention, an aluminum-containing ore such as a domestic clay 10 is fed to a digestor 11 along with make-up HF or $H_2SiF_6$ 12 and a process recycle stream 13 enriched in HF and/or $H_2SiF_6$ where they react to form a slurry 14 whose liquid phase contains the dissolved $AlF_3$ reaction product and whose solid phase is largely silica originating from the clay and $H_2SiF_6$.

The ore used can be any aluminum containing ore in which the aluminum is present in a chemical form capable of producing $AlF_3$ when the ore is treated with HF or $H_2SiF_6$. The clay 10 is preferably a raw uncalcined clay which has not been subjected to any grinding or other treatments to reduce its particle size. The HF or $H_2SiF_6$ reactant can be obtained from any suitable source such as a wet process phosphoric acid facility. The reaction between the clay and acid is illustratively carried out at temperatures between about 122° F. and the boiling point of the reaction mixture, which is normally about 212° F. or somewhat higher. Pressure is not critical to the leaching reaction and it proceeds quite satisfactorily at atmospheric pressure, but lower or higher pressure could be used if desired. The time required for the leaching reaction can vary considerably depending upon such factors as the reaction temperature and the desired extraction efficiency. The reaction of clay and acid can employ the stoichiometric amount of reactants, but a slight stoichiometric excess, e.g., 1 to 10%, of the fluorine-containing acid is preferably used.

The slurry 14 containing the $AlF_3$ product dissolved in its liquid phase is then sent to a filter 15 where the silica solids 16 are separated from the liquid phase to produce a clear filtrate 17 containing the $AlF_3$. The filter cake 16 is preferably washed with a recycle stream 18 to remove $AlF_3$ retained in the cake, after which the wash stream 18 is recycled to the digestor 11 for eventual recovery of the reclaimed $AlF_3$.

It is at this point, namely, when a clear $AlF_3$-enriched filtrate is produced, that the process of the present invention is effectively employed. Normally, the $AlF_3$-enriched filtrate 17 would be sent to a crystallizer 21 to recover the $AlF_3$ as crystals of hydrated $AlF_3$ having the formula $AlF_3 \cdot 3H_2O$. The crystallization would be carried out in accordance with crystallization procedures and equipment known to those skilled in the art. A small portion 23 of slurry, e.g., 5–10% or less, may optionally be recycled to crystallizer 21 to provide seed crystals of $AlF_3 \cdot 3H_2O$ to promote the crystallization process, thereby producing better product yields and crystals of larger average crystal sizes. In applying the process of this invention, however, the $AlF_3$-enriched filtrate 17 is first contacted with the organic extractant of the invention in iron removal circuit 19 to selectively remove iron therefrom and produce an iron-free aqueous raffinate 20 which is subsequently sent to crystallizer 21.

The crystallization slurry 22 is then sent to a filter 24 where the $AlF_3 \cdot 3H_2O$ crystals 25 are separated from their crystallization mother liquor 26. The crystals 25 are then preferably washed with a fresh stream of water 27 to recover some of the $AlF_3$-enriched mother liquor retained by the crystals. The wash water 27 is then preferably combined with a portion 28 of the crystallization mother liquor 26, e.g., about 40 to 60% of stream 26, to form a composite wash stream 18 which is then recycled to wash the silica cake 16, as previously discussed. Wash stream 18 is then returned to the digestor 11 for subsequent recovery of its $AlF_3$ content.

The recovered $AlF_3 \cdot 3H_2O$ crystals 25 are next sent to an oven, dryer, or other suitable apparatus 32 where they are subjected to temperatures high enough to dry the crystals, i.e., to remove unbound or free water, and dehydrate the crystals, i.e., to remove bound water 34 such as the waters of hydration. The drying and dehydration of the $AlF_3 \cdot 3H_2O$ crystals can be carried out in a single step or in two separate steps.

The dried and dehydrated $AlF_3$ product 33 is next subjected to pyrolysis in the presence of water (pyrohydrolysis) using any suitable apparatus 35, to convert the $AlF_3$ to alumina 36, e.g., in the presence of very hot steam 37. Alternatively, $AlF_3 \cdot 3H_2O$ crystals in either a dried or undried state can be directly subjected to temperatures high enough to carry out the pyrohydrolysis in order to utilize the water of crystallization, and any unbound water which may be associated with the crystals, as the source of the water in the pyrohydrolysis reaction. The alumina product 36 is then cooled 38 and can be used in any of the various applications for alumina, including the production of aluminum metal.

The pyrohydrolysis step 35 also generates HF vapors 39. All or a part 40 of this HF can be optionally withdrawn from the process for sale, production of aqueous HF, or other purposes. Alternatively, all or part of the HF 39 can be sent to a gas absorber or scrubber 41 where it contacts the portion of the crystallization mother liquor 26 which was not recycled to wash the silica cake 16, to form an HF enriched mother liquor 13 which is then recycled to the digestor 11 to supply the acid required in the process.

Some fluorine losses do occur in the process and ordinarily the HF-enriched recycle stream 13 does not provide all of the fluorine-containing acid required in the process. In this event, enough fresh make-up acid 12 is supplied to digestor 11 to compensate for the deficiency. The extent of the deficiency will depend to some degree upon the amount of HF 40 withdrawn from the process. The more HF withdrawn, the more HF or $H_2SiF_6$ that must be supplied by the make-up stream 12. In the event that all the HF is withdrawn at 40, virtually no HF would be present in the stream 13 recycled to the digestor, in which case practically the entire fluorine-containing acid requirement of the process could be supplied by make-up stream 12. Even if none of the HF 39 is recycled to the process, the crystallization mother liquor would normally still be recycled to the digestor 11 to recover its AlF$_3$ content.

When HF is to be recycled, the crystallization mother liquor 26 provides a convenient stream in which to absorb the HF for recycle. But it will be understood that the HF 39 need not be absorbed in stream 13 and instead could be absorbed in any suitable available recycle stream or returned as make-up stream 12. In the embodiment of the invention wherein all the HF 39 produced in the pyrohydrolysis step is withdrawn from the process, the crystallization mother liquor 13 is still recycled to the process but this time is enriched in H$_2$SiF$_6$ instead of HF as the result of absorbing a mixture of SiF$_4$ and HF vapors, which, when absorbed in the liquor, react to form H$_2$SiF$_6$. In another embodiment of the invention, the HF 39 produced in the pyrohydrolysis step is recycled to the process by absorbing it in the crystallization mother liquor 26, but a mixture of SiF$_4$ and HF vapors 42 is first blended with the HF 39 from the pyrohydrolysis to produce a stream 43 comprising a mixture of HF and SiF$_4$ which is then absorbed in the mother liquor 26. The SiF$_4$ and at least some of the HF react in the mother liquor to form H$_2$SiF$_6$ so that the recycled mother liquor 13 is enriched in H$_2$SiF$_6$ and in any HF which did not react with the SiF$_4$ to form H$_2$SiF$_6$. The stream of SiF$_4$ and HF 42 can originate from any source such as, for example, a wet process phosphoric acid facility wherein plentiful amounts of mixtures of SiF$_4$ and HF vapors are normally found.

The following example illustrates the process of the present invention when incorporated in the invention of our copending application.

EXAMPLE 5

100 parts of domestic uncalcined kaolin clay containing 18.2% aluminum were treated with about 237 parts of 21% by-product H$_2$SiF$_6$ obtained from the manufacture of wet process phosphoric acid. The resulting slurry was agitated vigorously for 20 minutes at atmospheric pressure and a temperature of about 193° F. The solids were then separated from the slurry by centrifugation and washed with 100 parts of H$_2$O, dried and weighed. Analysis of the separated solids showed a weight loss of about 40% and an aluminum content of 3.1%, corresponding to a 90% extraction of aluminum from the clay. The filtrate was then cooled to 150° F. and contacted at a pH of not more than 2 with the organic extractant of Exmample 1 in an organic-to-aqueous ratio (O/A) of ⅓ in the apparatus of FIG. 1, i.e., mixers M$_1$ and M$_2$ and settlers S$_1$ and S$_2$. The resulting iron-free aqueous raffinate containing dissolved AlF$_3$ was placed in a heated vessel and held at 203° F. for four hours to promote the crystallization of AlF$_3$.3H$_2$O. The AlF$_3$.3H$_2$O crystals were then separated from their crystallization mother liquor and dried at 220° F. and dehydrated at 800° F. to yield AlF$_3$ which was then heated at 1800° F. in the presence of sufficient steam to convert practically all the AlF$_3$ to Al$_2$O$_3$. The HF liberated during the pyrohydrolysis was recovered. About 28.8 parts of alumina product of better than 99% purity was produced, having the following analysis:

|  | parts | % by weight |
|---|---|---|
| Al$_2$O$_3$ : | 28.8 | 99.6 |
| SiO$_2$ : | nil | — |
| Fe$_2$O$_3$ : | nil | 0.02 |
| TiO$_2$ : | nil | — |
| H$_2$O : | nil | — |
| F : | nil | — |

This corresponds to a product yield based upon the alumina content of the clay of about 84%.

The specific and detailed information presented in the above examples and elsewhere herein is by way of illustration only, and such alterations and modifications thereof as would be apparent to those skilled in the art are deemed to fall within the scope and spirit of the invention, bearing in mind that the invention is defined only by the following claims.

What is claimed is:

1. A process for separating dissolved ferric iron from an aqueous solution having a pH of not more than about 3 and containing about 5 to about 40 weight % aluminum fluoride and said dissolved ferric iron which comprises contacting said solution at a temperature between about 140° and about 175° F. with an organic extractant comprising an inert diluent and a mixture containing at least about 30% by weight of a mono(alkylphenyl)phosphoric acid having the general formula:

and at least about 30% by weight of a di(alkylphenyl)phosphoric acid having the general formula:

wherein said percentages are based on the weight of said mixture, each Ph is a phenylene radical and each R is a straight chain or branched chain higher alkyl radical containing at least 4 carbon atoms and are the same or different, said mixture being dissolved in said inert diluent, whereby dissolved ferric iron is transferred selectively from said aqueous solution to said organic extractant, and separating the iron-loaded organic extractant from the iron-depleted aqueous solution.

2. Process as claimed in claim 1 wherein the pH of said aqueous solution is not greater than about 2.

3. Process as claimed in claim 1 wherein said aqueous solution before said contacting step contains at least about 1 gram per liter of dissolved ferric iron.

4. Process as claimed in claim 3 wherein the inert diluent is an aliphatic or aromatic hydrocarbon.

5. Process as claimed in claim 4 wherein said organic extractant contains from about 5% to about 30% of said mixture based on the total weight of said organic extractant.

6. Process as claimed in claim 5 wherein the organic extractant contains from 5% to 30% of a higher alkanol based on the total weight of said organic extractant.

7. Process as claimed in claim 1 wherein the separated iron-loaded organic extractant is contacted with an aqueous solution of hydrogen fluoride to transfer said iron to said aqueous solution of hydrogen fluoride and thereby regenerate said organic extractant.

8. Process as claimed in claim 1 wherein said aluminum fluoride is AlF$_3$.3H$_2$O and is separated from said iron-depleted aqueous solution.

9. A process which comprises:
 (a) reacting an aluminum-containing ore with hydrofluoric acid, fluosilicic acid or a mixture of hydrofluoric and fluosilicic acid to form an aqueous slurry containing aluminum fluoride and dissolved ferric iron in its aqueous liquid phase;
 (b) separating said aqueous liquid phase containing the aluminum fluoride and dissolved ferric iron from the solid phase of the slurry;
 (c) cooling the separated aqueous liquid phase to a temperature in the range of about 140° F. to about 175° F. and contacting same at a pH of not more than about 3 and at a temperature in said range with an organic liquid extractant comprising a mixture containing at least about 30% by weight of a mono(alkylphenyl)phosphoric acid having the general formula:

and at least about 30% by weight of a di(alkylphenyl)phosphoric acid having the general formula:

wherein said percentages are based on the weight of said mixture, each Ph is a phenylene radical and each R is a straight chain or branched chain higher alkyl radical containing at least 4 carbon atoms and are the same or different, said mixture being dissolved in an inert organic diluent whereby dissolved ferric iron is transferred selectively from said aqueous solution to said organic extractant;
 (d) separating the resulting iron-loaded organic extractant from the resulting iron-depleted aqueous solution;
 (e) heating the separated aqueous solution to a temperature of about 195° F. or higher and subjecting same to crystallization to produce crystals of hydrated aluminum fluoride;
 (f) separating the crystals from the resulting crystallization mother liquor;
 (g) drying the separated crystals; and
 (h) pyrohydrolyzing the dried crystals of aluminum fluoride to produce alumina and hydrofluoric acid.

10. Process as claimed in claim 9 wherein the ferric iron-containing organic extractant from step (c) is contacted with an aqueous solution of hydrogen fluoride to transfer said ferric iron to said aqueous solution of hydrogen fluoride and regenerate said organic extractant and recycling said regenerated organic extractant to step (c).

11. In a process for the recovery of aluminum from aluminum-containing ores which comprises treating said ore with a fluorine acid to form an aqueous solution containing aluminum fluoride and dissolved ferric iron, the improvement in separating said dissolved ferric iron from said solution comprising contacting said solution at a pH of not more than about 3 and at a temperature between about 140° and about 175° F. with an organic extractant comprising an inert diluent and a mixture containing at least about 30% by weight of a mono(alkylphenyl)phosphoric acid having the general formula:

and at least about 30% by weight of a di(alkylphenyl)phosphoric acid having the general formula:

wherein said percentages are based on the weight of said mixture, each Ph is a phenylene radical and each R is a straight chain or branched chain higher alkyl radical containing at least 4 carbon atoms and are the same or different, said mixture being dissolved in said inert diluent, whereby dissolved ferric iron is transferred selectively from said aqueous solution to said organic extractant, and separating the iron-loaded organic extractant from the iron-depleted aqueous solution.

* * * * *